United States Patent
Ono et al.

(10) Patent No.: US 6,719,344 B2
(45) Date of Patent: Apr. 13, 2004

(54) CENTER CONSOLE OF VEHICLE

(75) Inventors: Masayoshi Ono, Fuchu-cho (JP); Hiroshi Ohno, Fuchu-cho (JP); Junji Takahara, Fuchu-cho (JP); Nobuhisa Fujii, Hiroshima (JP); Takehiko Nemoto, Hiroshima (JP)

(73) Assignees: Mazda Motor Corporation (JP); Nishikawa Kasei Co., Ltd. (JP); Nifco Inc. (JP)

( * ) Notice: Subject to any disclaimer, the term of this patent is extended or adjusted under 35 U.S.C. 154(b) by 0 days.

(21) Appl. No.: 10/307,329

(22) Filed: Dec. 2, 2002

(65) Prior Publication Data

US 2003/0107228 A1 Jun. 12, 2003

(30) Foreign Application Priority Data

Dec. 12, 2001 (JP) ........................................ 2001-378743

(51) Int. Cl.[7] ................................................ B60R 7/04
(52) U.S. Cl. .............. 296/24.1; 296/37.14; 297/188.17; 297/411.21; 220/813; 224/726; 248/118
(58) Field of Search .............................. 296/24.1, 37.1, 296/37.7, 37.8, 37.12, 37.14; 297/188.16, 188.17, 188.19, 188.14, 188.21, 411.1, 411.21, 411.37; 224/275, 926; 220/813, 345.4, 811, 812; 248/311.2, 118

(56) References Cited

U.S. PATENT DOCUMENTS

| | | | | |
|---|---|---|---|---|
| 4,521,056 A | * | 6/1985 | Lindenmuth | 297/411.21 |
| 4,685,729 A | * | 8/1987 | Heesch et al. | 297/188.09 |
| 4,733,901 A | * | 3/1988 | Okuyama | 296/37.16 |
| 4,934,750 A | * | 6/1990 | Eichler et al. | 296/37.8 |
| 5,076,524 A | * | 12/1991 | Reh et al. | 248/296.1 |
| 5,085,481 A | * | 2/1992 | Fluharty et al. | 296/37.8 |
| 6,045,173 A | * | 4/2000 | Tiesler et al. | 296/37.8 |
| 6,059,243 A | * | 5/2000 | Hikage et al. | 248/311.2 |
| 6,244,648 B1 | * | 6/2001 | Gackstatter | 296/37.8 |
| 6,419,314 B1 | * | 7/2002 | Scheerhorn | 297/188.19 |
| 2001/0020620 A1 | * | 9/2001 | Katagiri et al. | 220/345.2 |
| 2002/0089203 A1 | * | 7/2002 | Flowerday et al. | 296/37.8 |
| 2003/0155786 A1 | * | 8/2003 | Kim et al. | 296/24.1 |

FOREIGN PATENT DOCUMENTS

| | | | | |
|---|---|---|---|---|
| JP | 05-50875 | | 3/1993 | |
| JP | 05-193417 A | * | 8/1993 | |
| JP | 07-313298 A | * | 12/1995 | |
| JP | 08-142761 A | * | 6/1996 | |
| JP | 10-166952 | | 6/1998 | |
| JP | 10-226260 A | * | 8/1998 | |
| JP | 200-153738 A | * | 2/2000 | |

* cited by examiner

Primary Examiner—D. Glenn Dayoan
Assistant Examiner—Patricia L. Engle
(74) Attorney, Agent, or Firm—Nixon Peabody LLP; Donald R. Studebaker

(57) ABSTRACT

A center console of a vehicle installed on its floor as if extending along a longitudinal direction of the vehicle has a bottle holder for holding drinking vessels, an accessory storage for holding small articles, a first lid for covering and uncovering the top of the bottle holder, and a second lid for covering and uncovering the top of the accessory storage. The first lid can be slid from a position where the top of the bottle holder is covered by the first lid to a position where the top of the bottle holder is uncovered and, with the first and second lids joined into a single structure, the first and second lids can be swung up together about fixed parts of hinges from a position where the top of the accessory storage is covered to a position where the top of the accessory storage is uncovered.

13 Claims, 8 Drawing Sheets

CENTER CONSOLE OF VEHICLE

BACKGROUND OF THE INVENTION AND RELATED ART STATEMENT

1. Field of the Invention

The present invention relates to a center console of a vehicle installed on its floor as if extending along a longitudinal direction of the vehicle.

2. Description of the Related Art

One example of a conventional center console of a vehicle is disclosed in Japanese Unexamined Patent Publication No. 10-166952. As shown in the Patent Publication, the center console comprises a console box which is installed on one side of a driver's seat and has an internal storage space opening upward, a console lid of which one end is hinged to the console box so that the console lid can be swung up about its hinged end to close and open the storage space, a first locking device for holding the console lid at a first open position from which the console lid is released when it is swung in its closing direction, and a second locking device for holding the console lid at a second open position which is reached when the console lid is further swung in its opening direction, the second locking device being provided with an unlock mechanism for releasing the console lid from the second open position. In this center console, the console lid is released from the second open position when the console lid is forced in its closing direction following an operation for unlocking the second locking device.

An advantage of the aforementioned structure of the center console provided with the first and second locking devices for holding the console lid at two different open positions from which the console lid is released in different ways is that the console lid can be held at two different angles suitable for purposes of use, depending on whether a vehicle occupant places a drinking vessel in a bottle holder provided in the internal storage space of the console box or stores small articles in the storage space, for example. This conventional center console, however, has a disadvantage that the console lid hinders action of the vehicle occupant seated on a side in which direction the console lid is opened and the occupant tends to hit the elbow against the console lid when placing a drinking vessel in or taking it out of the bottle holder. This is because the console lid has a relatively large size to cover the entire top surface of the storage space and the bottle holder is used with the console lid retained in its second open position.

Another example of a conventional center console of a vehicle is disclosed in Japanese Unexamined Patent Publication No. 5-50875. In this center console, at least one lid for covering and uncovering an aperture of an internal storage space of a console box, the aperture being provided in a front or rear portion of the top surface of the console box, is slidably supported by the console box together with a bottle holder for holding a drinking vessel. When using the internal space of the console box as an accessory storage for holding small articles, a vehicle occupant should slide the lid and the bottle holder together to an open position of the lid, and when using the bottle holder alone, the vehicle occupant should slide only the lid to its open position. This structure makes it possible to prevent the lid from hindering action of the vehicle occupant and use the console box as both the accessory storage and the bottle holder.

When both the lid and the bottle holder are supported by the console box so that they can be individually slid and the console box can serve as both the accessory storage and the bottle holder as stated above, however, there arises a problem that a storage space used as the accessory storage and the bottle holder are both located close to one end (front or rear) of the console box, making it impossible to efficiently use the whole of the internal space of the console box.

SUMMARY OF THE INVENTION

In light of the aforementioned problems of the prior art, it is an object of the invention to provide a center console of a vehicle, which enables efficient use of an internal storage space of the center console while offering greater convenience of use of the storage space.

In order to achieve the above object according to the invention, a center console of a vehicle installed on its floor as extending along a longitudinal direction of the vehicle has a bottle holder for holding a drinking vessel, an accessory storage for holding small articles, a first lid for covering and uncovering the top of the bottle holder, and a second lid for covering and uncovering the top of the accessory storage. In this center console, the first lid can be slid from a position where the top of the bottle holder is covered by the first lid to a position where the top of the bottle holder is uncovered and, with the first and second lids joined into a single structure, the first and second lids can be swung up together about a fixed part of a hinge from a position where the top of the accessory storage is covered to a position where the top of the accessory storage is uncovered.

In this construction, the top of the bottle holder is opened enabling the use of the bottle holder when the first lid is slid from its open position in the direction of the accessory storage, and the top of the accessory storage is opened enabling the use of the accessory storage when the first and second lids joined into a single structure are swung up about the fixed part of the hinge. This construction offers great convenience in using the bottle holder and the accessory storage, also enabling efficient use of an internal space of the center console.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
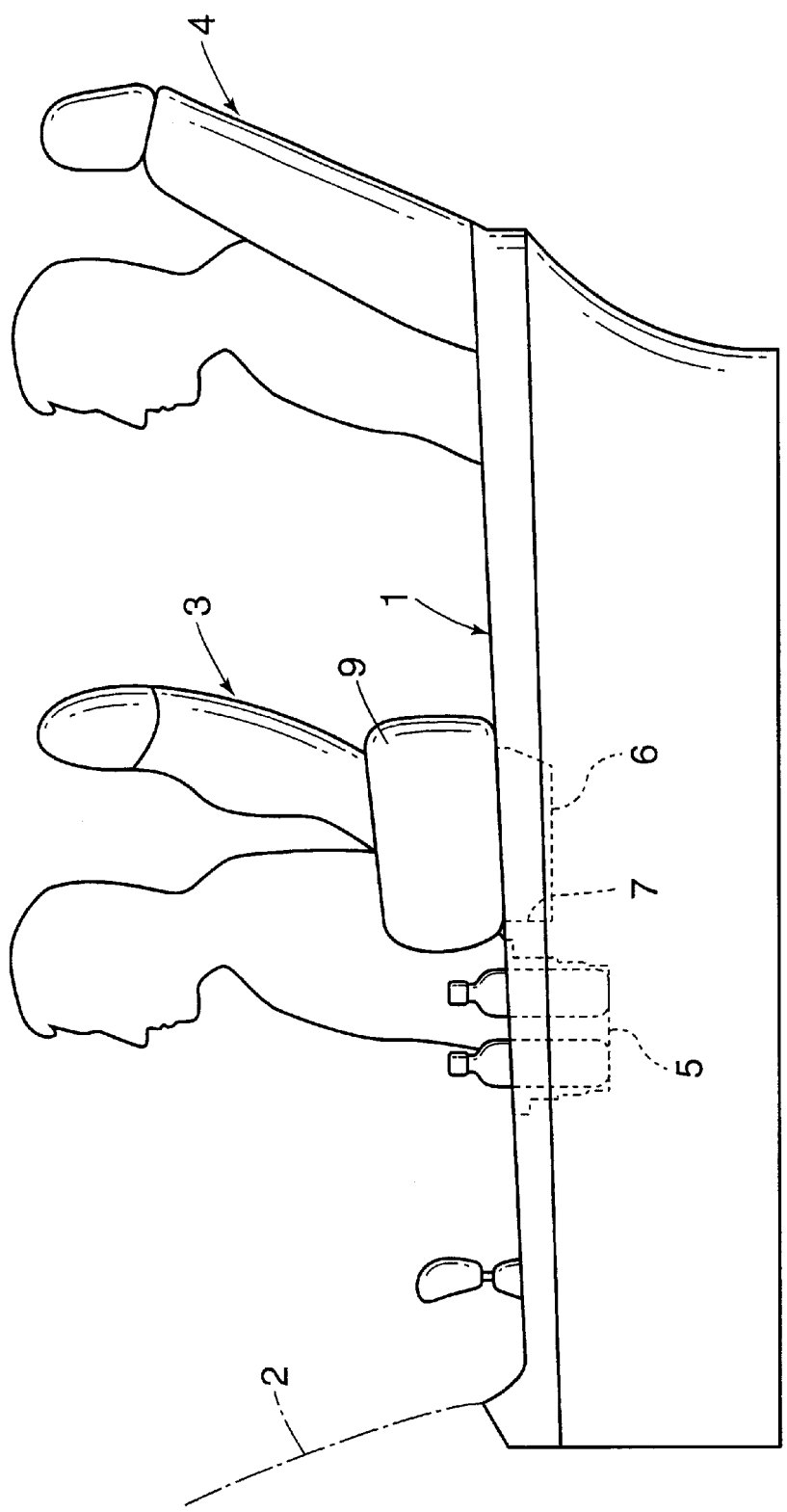
FIG. 1 is a side view generally showing the construction of a center console of a vehicle according to an embodiment of the invention.
Figure 2:
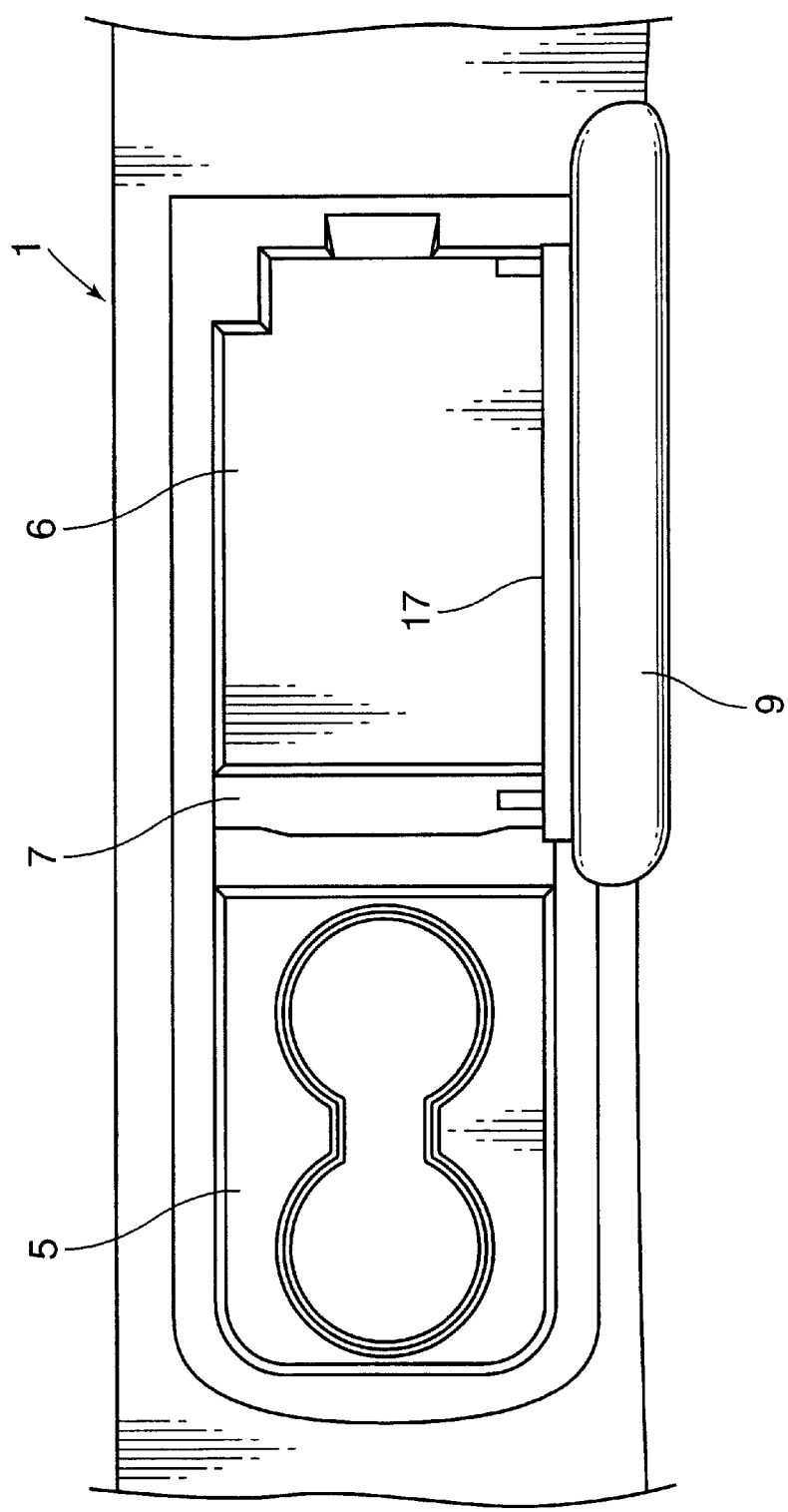
FIG. 2 is a plan view showing the construction of a principal part of the center console.

FIGS. 1 and 2 are diagrams showing the construction of a center console of a vehicle according to an embodiment of the invention. A console body 1 which is a main constituent component of the center console is installed as if extending rearward from a lower part of an instrument panel 2. The console body 1 runs toward the rear of a vehicle body between left and right front seats 3 and between left and right rear seats 4. The console body 1 is provided with a bottle holder 5 for holding drinking vessels at a position just between the left and right front seats 3 as well as an accessory storage 6 for holding small articles on the rear side of the bottle holder 5, with the bottle holder 5 and the accessory storage 6 separated by a partition 7.

Figure 3:
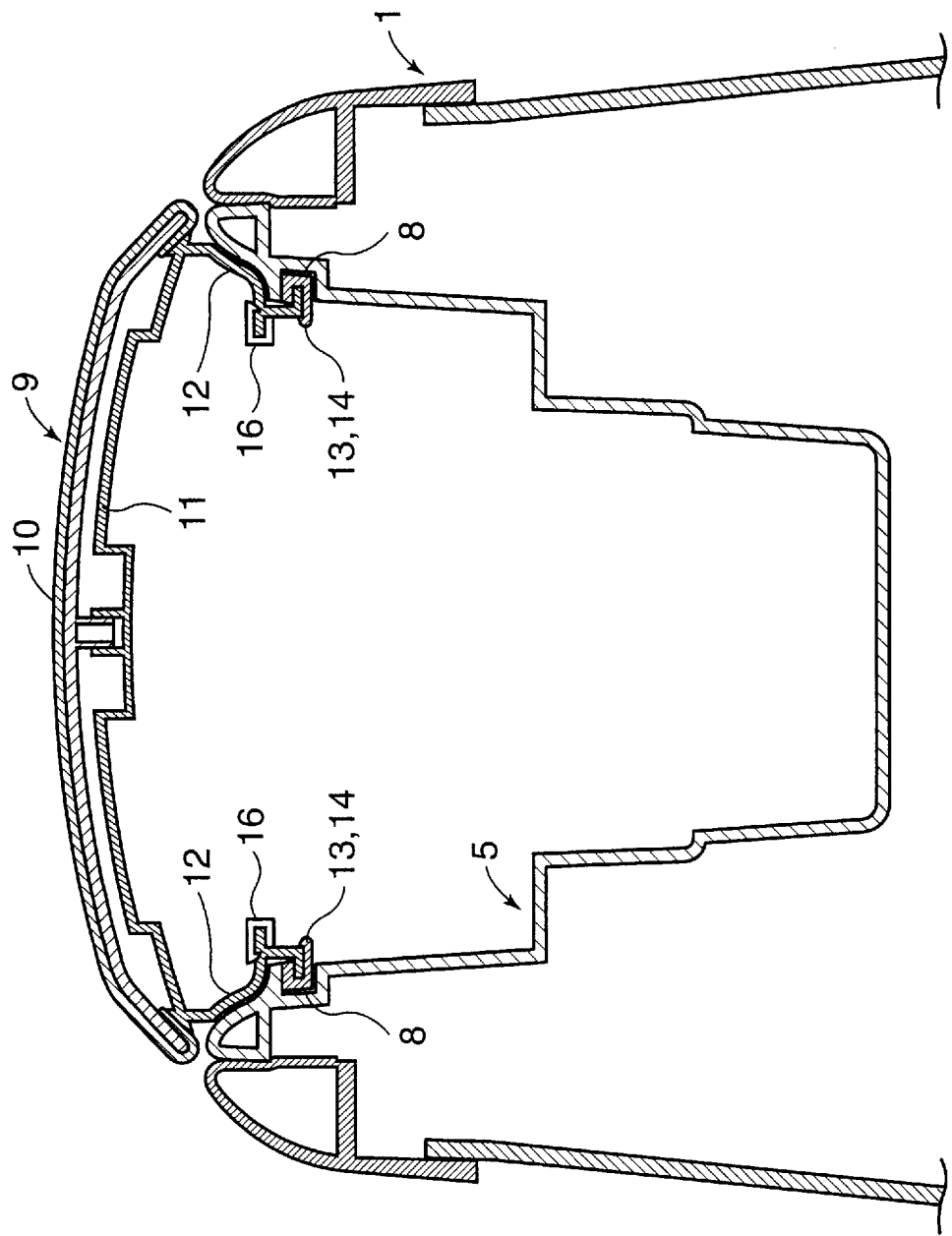
FIG. 3 is a transverse sectional view showing the structure of a bottle holder.
Figure 4:
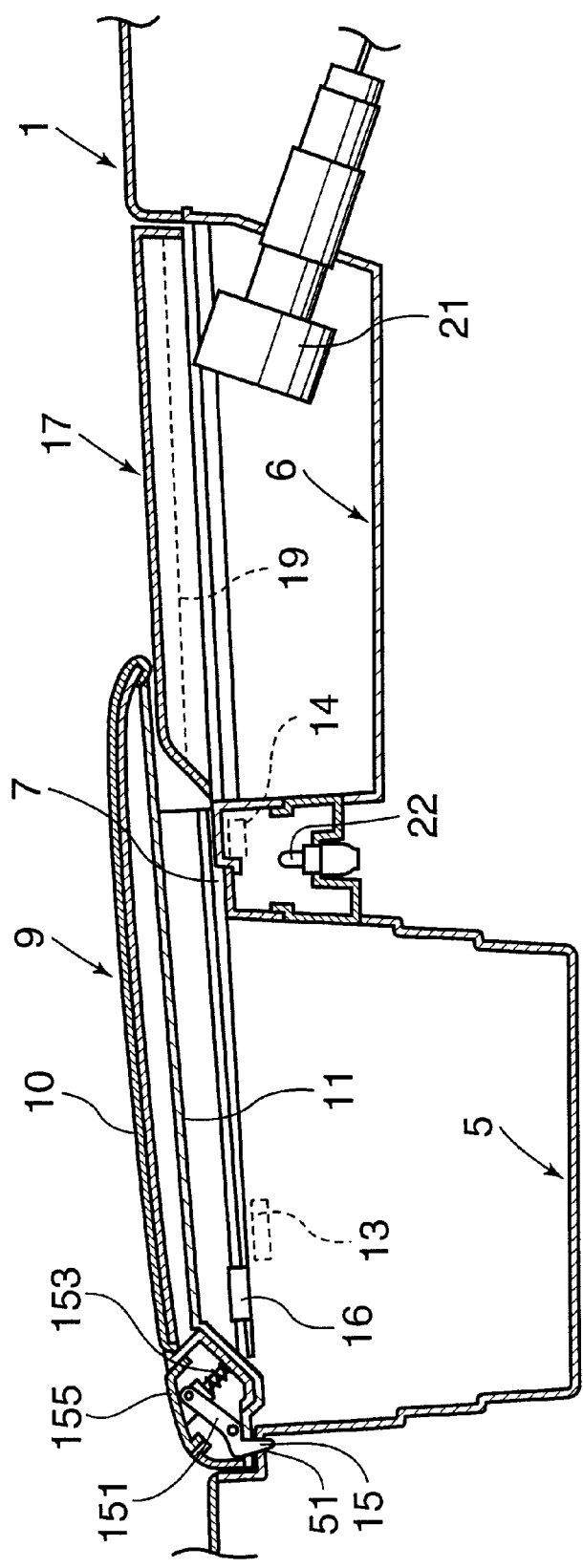
FIG. 4 is a longitudinal sectional view showing the structure of the bottle holder and an accessory storage.

As shown in FIGS. 3 and 4, slide guides 8, each having a U-shaped groove, extend in a longitudinal direction of the vehicle in upper parts of left and right side walls of the bottle holder 5 and a first lid 9 is supported between the left and right slide guides 8 in such a way that the first lid 9 can be slid back and forth along the slide guides 8. The first lid 9 includes a top plate 10 which is large enough to cover the top surface of the bottle holder 5, a bottom plate 11 provided beneath the top plate 10, and a pair of side plates 12 extending downward from both left and right edges of the bottom plate 11. A pair of first sliders 13 and a pair of second sliders 14 are attached, respectively, to front and rear parts of lowermost flange portions of the left and right side plates 12. As the first and second sliders 13, 14 are slid along the slide guides 8, the first lid 9 is moved from a closed position shown in FIG. 4 in which the top of the bottle holder 5 is covered by the first lid 9 to an open position shown in FIG. 5 in which the top of the bottle holder 5 is opened with the first lid 9 located closer to the accessory storage 6.

The first lid 9 is provided at its front end with a locking device 15 including a lock lever 151 which is detachably hooked onto a locking hole 51 formed in a front part of the surface of the bottle holder 5, for example, a pusher formed of a compression spring 153 for forcing the lock lever toward its locking position, and an unlocking member 155 by which the lock lever 151 can be pushed in its unlocking direction. Close to front ends of the side plates 12, there is provided a pair of third sliders 16 which enter left and right slide guides 19 provided on a second lid 17 when the first lid 9 is slid to the aforementioned open position as will be later described in further detail. In this center console, the first and second sliders 13, 14 are released from the slide guides 8 formed in the upper parts of the left and right side walls of the bottle holder 5 at a point in time when the first lid 9 has been slid to its open position.

Figure 6:
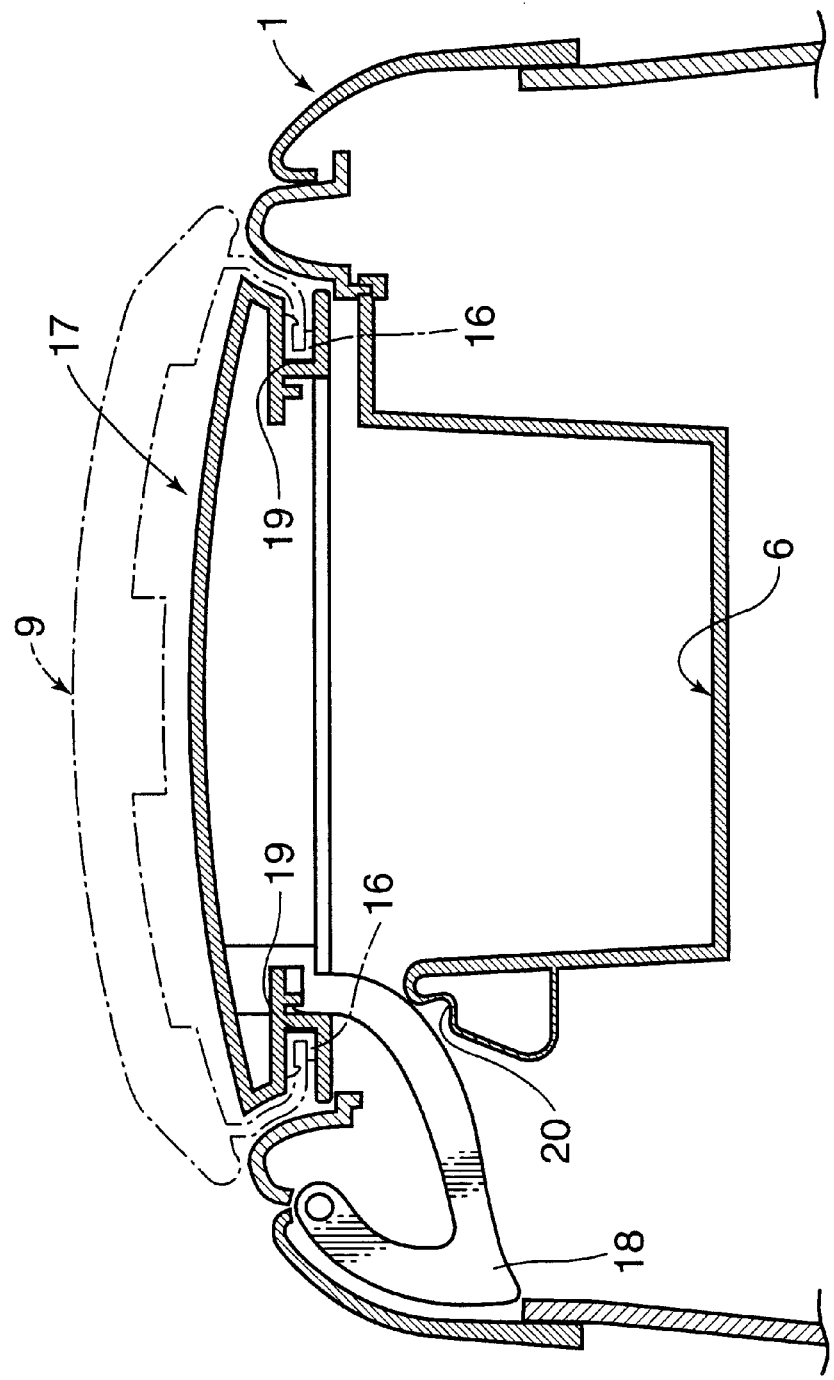
FIG. 6 is a transverse sectional view showing the structure of the accessory storage with its lid closed.
Figure 7:
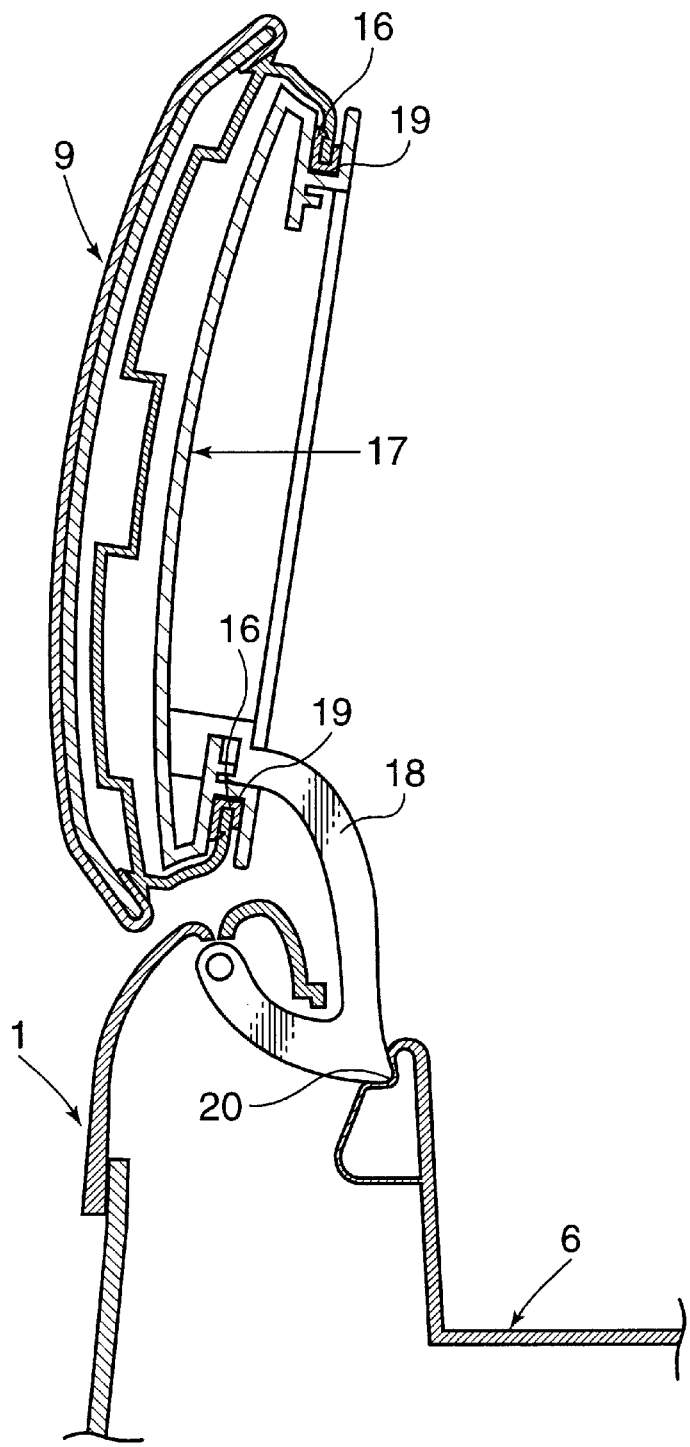
FIG. 7 is a transverse sectional view showing the structure of the accessory storage with its lid opened.

On the exterior of one side wall of the accessory storage 6, there are provided front and rear hinges 18 which support the second lid 17 for covering the top of the accessory storage 6 in such a manner that the second lid 17 can be swung about fixed ends of the hinges 18 as shown in FIGS. 6 and 7. The aforementioned slide guides 19, each having a U-shaped groove, in which the third sliders 16 provided on the first lid 9 enter are provided along both left and right ends of the second lid 17. The first lid 9 and the second lid 17 are joined together when the third sliders 16 have entered into the slide guides 19. By swinging up the first lid 9 and the second lid 17 together in this state about the fixed ends of the hinges 18, they can be moved from a closed position shown in FIG. 6 in which the top of the accessory storage 6 is covered by the second lid 17 to an open position shown in FIG. 7 in which the top of the accessory storage 6 is opened.

Figure 5:
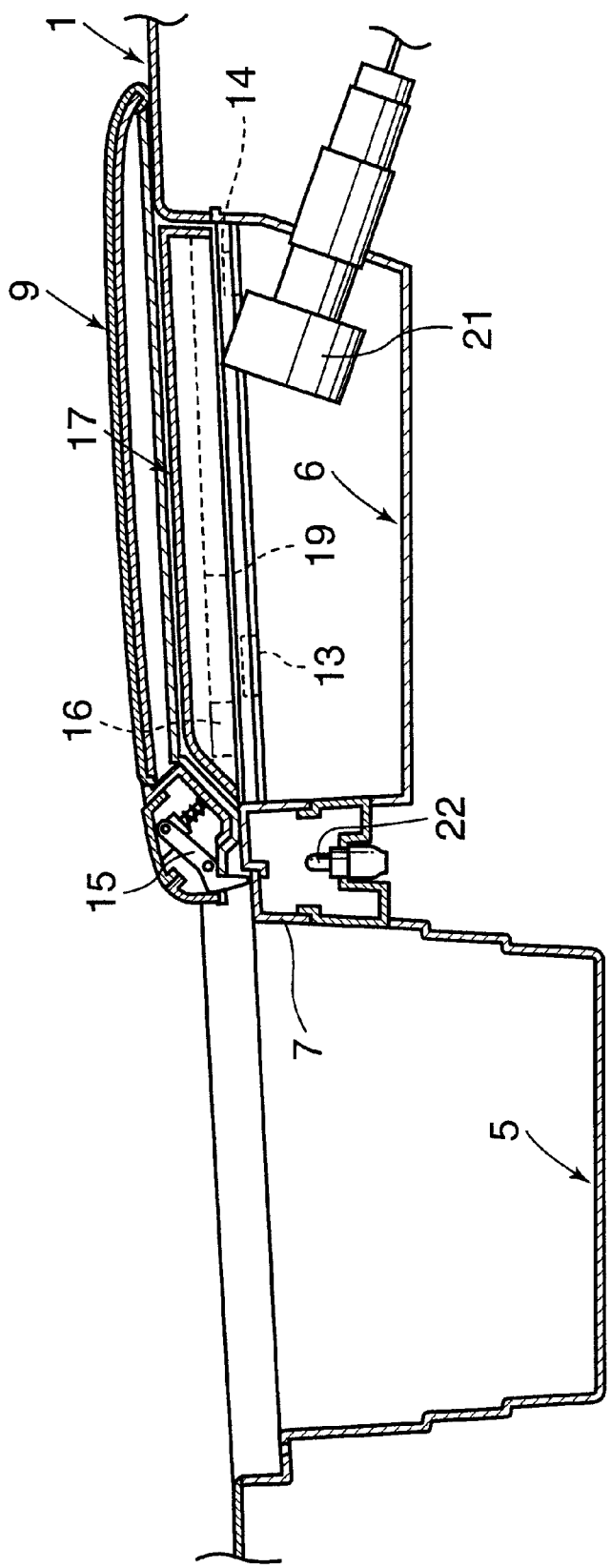
FIG. 5 is a longitudinal sectional view corresponding to FIG. 4 showing in particular a state in which a first lid for the bottle holder is opened.

In one side wall of the accessory storage 6, there is formed a recess 20 in which hooking projections of the hinges 18 can be fitted to hold the first lid 9 and the second lid 17 together in their open position. As shown in FIGS. 4 and 5, there is provided a power adaptor 21 used for charging storage batteries of a mobile phone, for example. In addition, a lamp 22 for illuminating the inside of the bottle holder 5 and the accessory storage 6 is provided in the partition 7 between the bottle holder 5 and the accessory storage 6.

Figure 8:
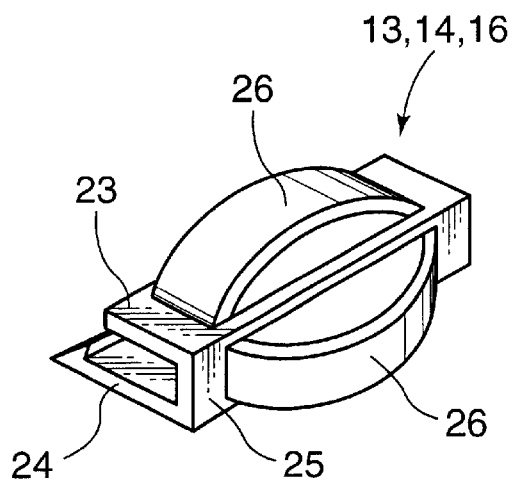
FIG. 8 is a perspective view showing the structure of a slider.
Figure 9:
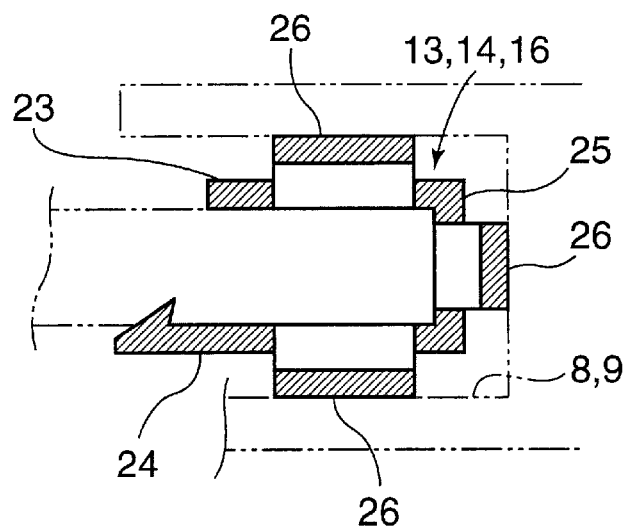
FIG. 9 is a sectional view of the slider.

As shown in FIGS. 8 and 9, the first to third sliders 13, 14, 16 are each formed of a member having a generally U-shaped cross section. This U-shaped member has upper and lower horizontal portions 23, 24 and a vertical portion 25 interconnecting lateral ends of the upper and lower horizontal portions 23, 24. On the two horizontal portions 23, 24 and the vertical portion 25, there are individually formed outward-bulging arc-shaped projections 26. The center console is constructed such that, with the individual projections 26 held in contact with inner wall surfaces of the slide guides 8, 19 having the U-shaped grooves, the first to third sliders 13, 14, 16 slide along the respective slide guides 8, 19.

When using the bottle holder 5 of the center console thus constructed, a vehicle occupant should unlock the first lid 9 which is locked by the locking device 15 and slide the first lid 9 rearward (in the direction of the accessory storage 6) from the aforementioned closed position, so that the first lid 9 covering the bottle holder 5 is set to the open position shown in FIG. 5 and place a drinking vessel in the bottle holder 5, for example.

On the other hand, when using the accessory storage 6, the vehicle occupant should release the first and second sliders 13, 14 from the slide guides 8 formed in the upper parts of the left and right side walls of the bottle holder 5 by moving the first lid 9 in the direction of the accessory storage 6 up to the open position shown in FIG. 5 and, with the third sliders 16 fitted in the slide guides 19 formed in the second lid 17 to join the first lid 9 and the second lid 17 with each other, the occupant should swing up the first lid 9 and the second lid 17 together to uncover the top of the accessory storage 6.

As so far described, the center console of the present embodiment has the bottle holder 5 for holding drinking vessels, the accessory storage 6 for holding small articles, the first lid 9 for covering and uncovering the top of the bottle holder 5 and the second lid 17 for covering and uncovering the top of the bottle holder 5 and the accessory storage 6, wherein the top of the bottle holder 5 is opened by sliding the first lid 9 from the closed position where the top of the bottle holder 5 is closed in the direction of the accessory storage 6, and the top of the accessory storage 6 is opened by swinging up the first lid 9 and the second lid 17 as they are joined together from their closed position to the open position about the fixed ends of the hinges 18 provided in the center console. This construction offers great convenience in using the bottle holder 5 and the accessory storage 6, also enabling efficient use of the internal space of the center console.

When the center console is constructed such that the top of the bottle holder 5 is opened and closed by a lid swingably supported by hinges provided at one side of the bottle holder 5, the lid could be easily pushed down from its upright position and hit against a drinking vessel held in the bottle holder 5, because the vehicle occupant tends to hit the elbow or other part of the body against the lid. In this embodiment, the bottle holder 5 is made usable by opening its top only when the first lid 9 is slid from its closed position in the direction of the accessory storage 6 as described above, so that the vehicle occupant can use the bottle holder 5 without causing the aforementioned problem.

The center console of the embodiment is constructed such that the top of the accessory storage 6 is opened to allow the use of the accessory storage 6 by first sliding the first lid 9 from its closed position toward the accessory storage 6 and then swinging up the first lid 9 and the second lid 17 as they are joined together about the fixed ends of the hinges 18 as stated above. This construction makes it possible to uncover the top of both the bottle holder 5 and the accessory storage 6, allowing for efficient use of the internal space of the center console.

Also, because the first lid 9 is stacked on top of the second lid 17, resulting in a reduction in their overall front-to-back dimension when they are swung together to the open position about the fixed ends of the hinges 18 as stated above, it is possible to prevent them from interfering with the elbow or other part of the body of the vehicle occupant, unlike the earlier-mentioned construction of the conventional center console in which an elongate lid covering both the bottle holder and the accessory storage is swung up to the open position.

Since the hinges 18 for swingably supporting the first lid 9 and the second lid 17 as they are joined together are provided on one side of the center console, the hinges 18 can be attached to one side of the accessory storage 6 using its side space. This construction serves to prevent a reduction in an internal storage space of the accessory storage 6 as in a construction in which first and second lids joined into a single structure are swung together rearward about a hinge provided at a rear end of the accessory storage 6.

Furthermore, since the partition 7 is provided between the bottle holder 5 and the partition 7 in the foregoing embodiment, it is possible to prevent small articles placed in the accessory storage 6 from moving into the bottle holder 5. Particularly because the center console of the embodiment is provided with the lamp 22 for illuminating the inside of the bottle holder 5 and the accessory storage 6, the vehicle occupant can conveniently use the center console during the nighttime, for instance.

According to the invention, the bottle holder 5 and the accessory storage 6 may be separately formed and assembled together or formed together as a single structure. An advantage of one-piece molding the bottle holder 5 and the accessory storage 6 using a single metal die is a reduction in manufacturing cost.

When the console body 1 of the center console is elongated to extend from the lower part of the instrument panel 2 at least to a cushion of the rear seats 4 as shown in the foregoing embodiment, it is possible to provide the bottle holder 5 and the accessory storage 6 at desired positions within the overall front-to-back expanse of the center console.

In the foregoing embodiment, the slide guides 8 for supporting the first and second sliders 13, 14 are attached to the left and right side plates 12 of the first lid 9 in a manner that the first and second sliders 13, 14 can slide along the upper parts of left and right side walls of the bottle holder 5, and the first and second sliders 13, 14 are disengaged from the slide guides 8 releasing the first lid 9 from the slide guides 8. This construction makes it possible to swing up the first lid 9 and the second lid 17 together only after the first lid 9 is slid such that it is stacked on top of the second lid 17. This serves to reliably prevent a problem that the first and second sliders 13, 14 are swung to their upright position before the first lid 9 is fully slid over the second lid 17 to their fully openable position.

Although the foregoing discussion has dealt with one preferred embodiment of the invention in which the bottle holder 5 is located closer to the front of the vehicle and the accessory storage 6 in the back of the bottle holder 5, the bottle holder 5 and the accessory storage 6 may be oppositely arranged in one variation of the embodiment. In another variation of the embodiment, magnet stoppers may be provided to retain the first lid 9 and the second lid 17 in such a manner that they would not vibrate loose in their closed state when the vehicle is running.

In summary, according to the invention, a center console of a vehicle installed on its floor as if extending along a longitudinal direction of the vehicle has a bottle holder for holding a drinking vessel, an accessory storage for holding small articles, a first lid for covering and uncovering the top of the bottle holder, and a second lid for covering and uncovering the top of the accessory storage. In this center console, the first lid can be slid from a position where the top of the bottle holder is covered by the first lid to a position where the top of the bottle holder is uncovered and, with the first and second lids joined into a single structure, the first and second lids can be swung up together about a fixed part of a hinge from a position where the top of the accessory storage is covered to a position where the top of the accessory storage is uncovered.

In this construction, the top of the bottle holder is opened enabling the use of the bottle holder when the first lid is slid from its open position in the direction of the accessory storage, and the top of the accessory storage is opened enabling the use of the accessory storage when the first and second lids joined into a single structure are swung up about the fixed part of the hinge. This construction offers great convenience in using the bottle holder and the accessory storage, also enabling efficient use of an internal space of the center console.

In one feature of the invention, the hinge swingably supporting the first and second lids which are joined into a single structure is provided on a side surface of the center console.

In this construction, the first and second lids can be swung together sideways about the fixed part of the hinge from their closed position where they cover the top of the accessory storage to their open position, allowing for efficient use of the internal space of the center console.

In another feature of the invention, a partition is provided between the bottle holder and the accessory storage to separate them from each other.

This construction helps prevent small articles placed in the accessory storage from moving into the bottle holder.

In another feature of the invention, the bottle holder and the accessory storage are one-piece molded.

This construction is advantageous in that the bottle holder and the accessory storage can be manufactured at reduced cost.

In still another feature of the invention, a main console member of the center console is so installed as to span a range from a lower part of an instrument panel at least to a cushion of a rear seat.

This construction makes it possible to provide the bottle holder and the accessory storage at desired positions within the overall front-to-back expanse of the center console spanning from the lower part of the instrument panel to the cushion of the rear seat.

In yet another feature of the invention, a slide guide for supporting the first lid slidably along a side wall of the bottle holder is provided at an upper part of the side wall, and the first lid is released from the slide guide at a point where the first lid has been moved to its open position.

In this construction, the first lid is released from the slide guide when the first lid is has been moved to its open position located above the accessory storage, whereby the first and second lids can be swung up together as a single structure from their closed position to their open position. This serves to prevent a problem that the first and second lids are swung to their upright position before the first lid is fully slid over the second lid to their fully openable position.

This application is based on Japanese patent application serial no. 2001-378743, filed in Japan Patent Office on Dec. 12, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A center console of a vehicle installed on its floor, extending along a longitudinal direction of the vehicle, said center console comprising:
    a bottle holder for holding a drinking vessel;
    an accessory storage for holding small articles;
    a first lid for covering and uncovering the top of the bottle holder; and
    a second lid for covering and uncovering the top of the accessory storage; and
    a hinge provided on said center console;
    wherein the first lid can be slid from a first position where the top of the bottle holder is covered by the first lid to a second position where the top of the bottle holder is uncovered and the second lid is substantially covered by the first lid, and
    wherein when the first and second lids are joined into a single structure, the first and second lids can be swung up together about said hinge from a position where the top of the accessory storage is covered to a position where the top of the accessory storage is uncovered.

2. A center console of a vehicle according to claim 1, wherein the hinge swingably supporting the first and second lids as they are joined together into a single structure is provided on a side surface of the center console.

3. A center console of a vehicle according to claim 1, wherein a partition is provided between the bottle holder and the accessory storage.

4. A center console of a vehicle according to claim 1, wherein the bottle holder and the accessory storage are molded as one-piece.

5. A center console of a vehicle according to claim 1, wherein a main console member of the center console is so installed as to span a range from a lower part of an instrument panel to at least a cushion of a rear seat.

6. A center console of a vehicle installed on its floor, extending along a longitudinal direction of the vehicle, said center console comprising:
    a bottle holder for holding a drinking vessel;
    an accessory storage for holding small articles;
    a first lid for covering and uncovering the top of the bottle holder; and
    a second lid for covering and uncovering the top of the accessory storage; and
    a hinge provided on said center console;
    wherein the first lid can be slid from a position where the top of the bottle holder is covered by the first lid to a position where the top of the bottle holder is uncovered and
    when the first and second lids joined into a single structure, the first and second lids can be swung up together about said hinge from a position where the top of the accessory storage is covered to a position where the top of the accessory storage is uncovered;
    wherein a slide guide for supporting the first lid slidably along a side wall of the bottle holder is provided at an upper part of the side wall, and the first lid is released from the slide guide at a point where the first lid has been moved to its open position.

7. A center console of a vehicle installed on its floor, extending along a longitudinal direction of the vehicle, said center console comprising:
    a bottle holder for holding a drinking vessel, including a first guiding portion;
    an accessory storage for holding small articles;
    a first lid for covering and uncovering the top of the bottle holder, said first lid including:
        a first sliding portion such that said first sliding portion is slidable along the first guiding portion and
        a second sliding portion;
    a second lid for covering and uncovering the top of the accessory storage, said second lid including a second guiding portion such that said second sliding portion of the first lid is slidable along the second guiding portion; and
    a hinge provided on said center console;
    wherein said first lid is slidable between
        a first position where the top of the bottle holder is covered by the first lid and
        a second position where the top of the bottle holder is uncovered and the top surface of the second lid is substantially covered by the first lid and the first lid and the second lid are joined into a single structure, and
    wherein when the first lid is at the second position, the first and second lids can be swung up together about said hinge from a position where the top of the accessory storage is covered to a position where the top of the accessory storage is uncovered.

8. A center console of a vehicle according to claim 7, wherein said first guiding portion is a recess extending along the longitudinal direction of vehicle, formed on the bottle holder.

9. A center console of a vehicle according to claim 8, wherein said first sliding portion of the first lid is slidably engageable with the first guiding portion formed on the bottle holder.

10. A center console of a vehicle according to claim 7, wherein said second guiding portion is a recess extending along the longitudinal direction of vehicle, formed on the outer surface of the second lid.

11. A center console of a vehicle according to claim 8, wherein said second sliding portion of the first lid is slidably engageable with the second guiding portion of the second lid.

12. A center console of a vehicle installed on its floor, extending along a longitudinal direction of the vehicle, said center console comprising:
    a bottle holder for holding a drinking vessel;
    an accessory storage for holding small articles;
    a first lid for covering and uncovering the top of the bottle holder;
    a second lid for covering and uncovering the top of the accessory storage; and a hinge provided on said center console, the hinge extending along the longitudinal direction of the vehicle;

wherein the first lid can be slid from a position where the top of the bottle holder is covered by the first lid to a position where the top of the bottle holder is uncovered, and wherein when the first and second lids are joined into a single structure, the first and second lids can be swung up together about said hinge from a position where the top of the accessory storage is covered to a position where the top of the accessory storage is uncovered.

13. A center console of a vehicle installed on its floor, said center console extending along a longitudinal direction of the vehicle, said center console comprising:

a bottle holder for holding a drinking vessel;

an accessory storage for holding small articles;

a first lid for covering and uncovering the top of the bottle holder, the first lid having a lead end;

a second lid for covering and uncovering the top of the accessory storage, the second lid having a lead end; and a hinge provided on said center console;

wherein the first lid can be slid from a first position where the top of the bottle holder is covered by the first lid and the lead end of the first lid is positioned in front of the lead end of the second lid, to a second position where the top of the bottle holder is uncovered; and wherein when the first and second lids are joined into a single structure, the first and second lids can be swung up together about said hinge from a position where the top of the accessory storage is covered to a position where the top of the accessory storage is uncovered.

* * * * *